Aug. 11, 1925.
P. Q. WILLIAMS
GLASSWARE CONVEYING DEVICE
Filed Oct. 2, 1922
1,549,399
3 Sheets-Sheet 1
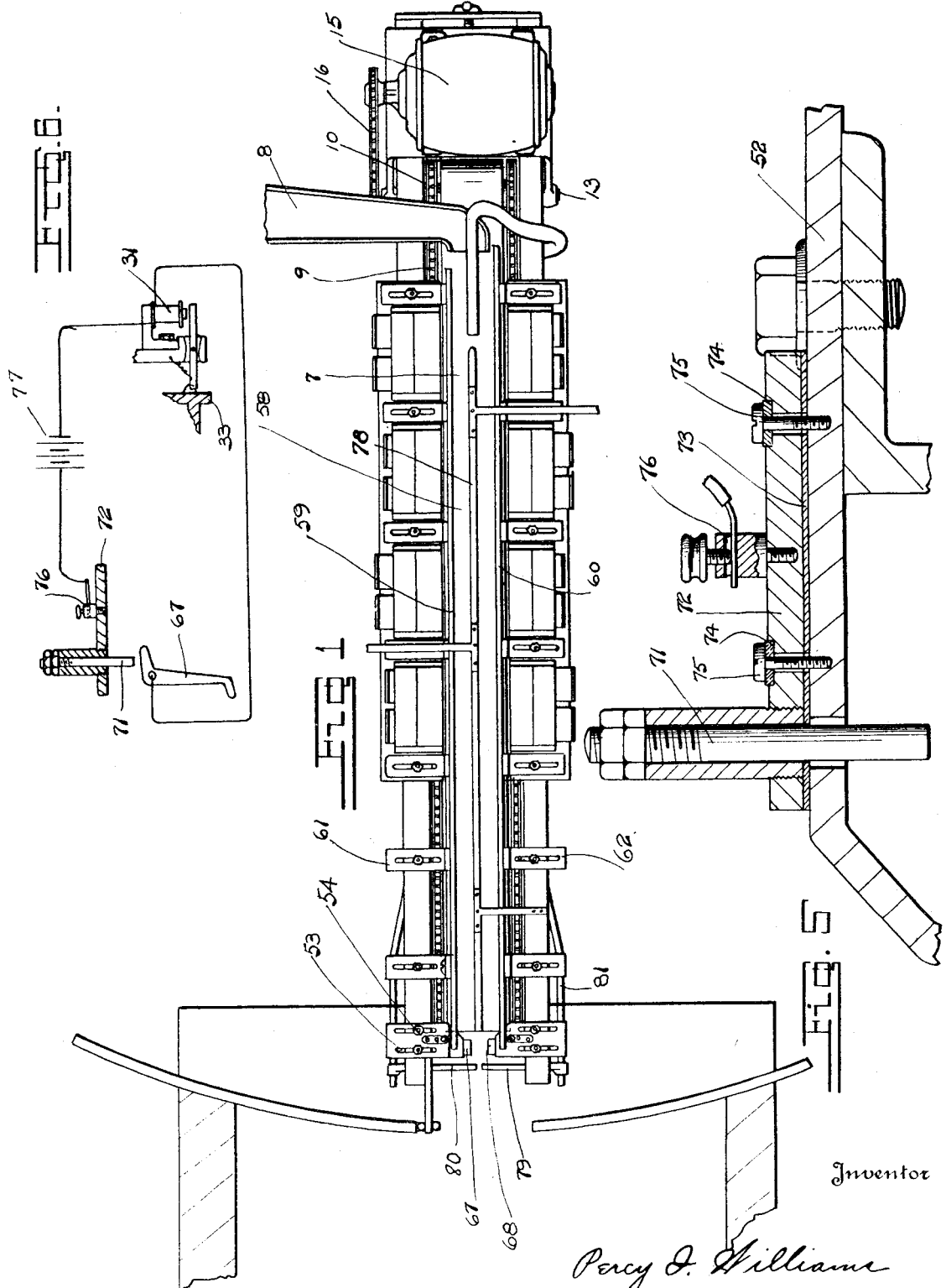
Inventor
Percy Q. Williams
By Walter F. Murray Attorney

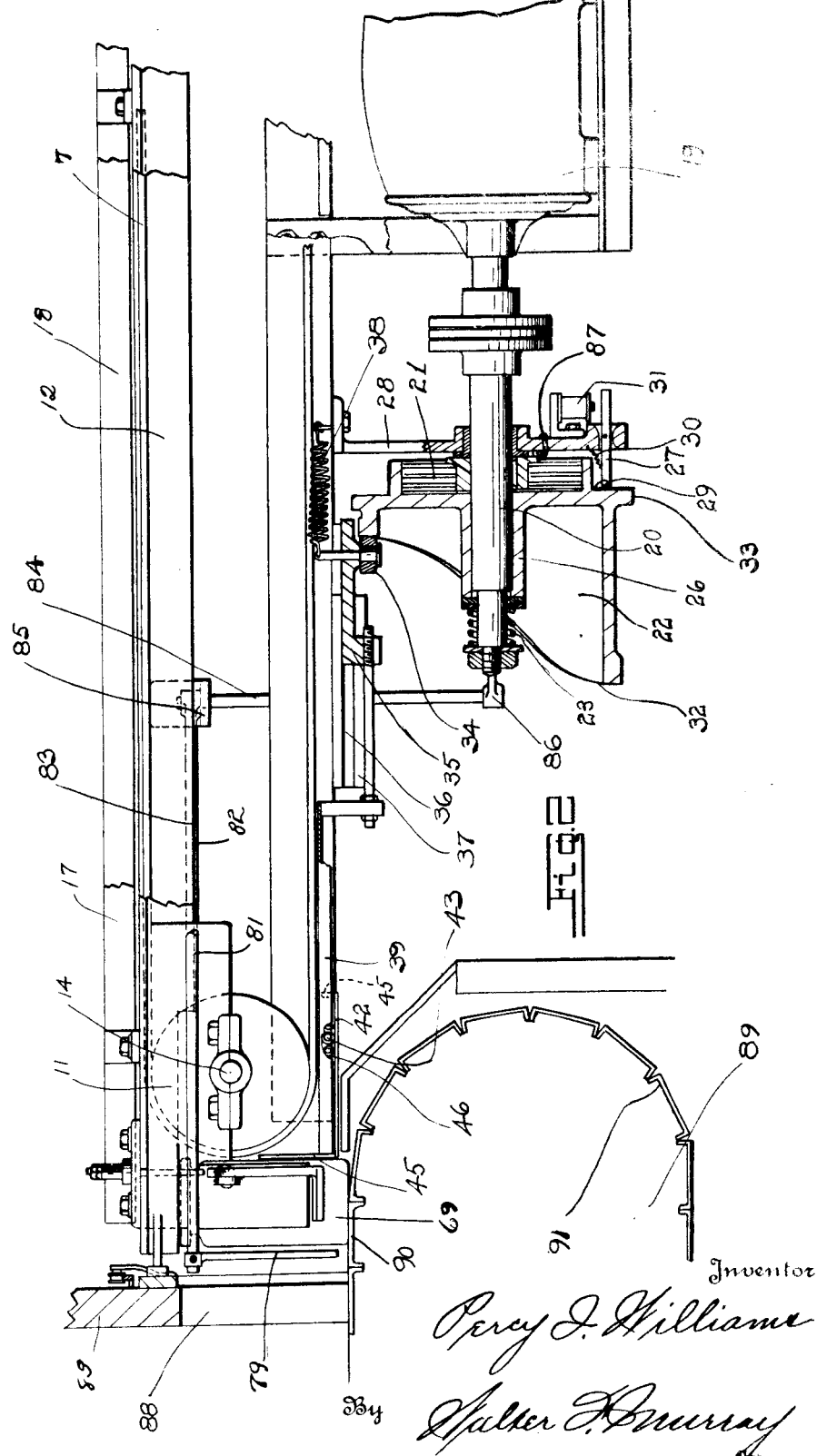

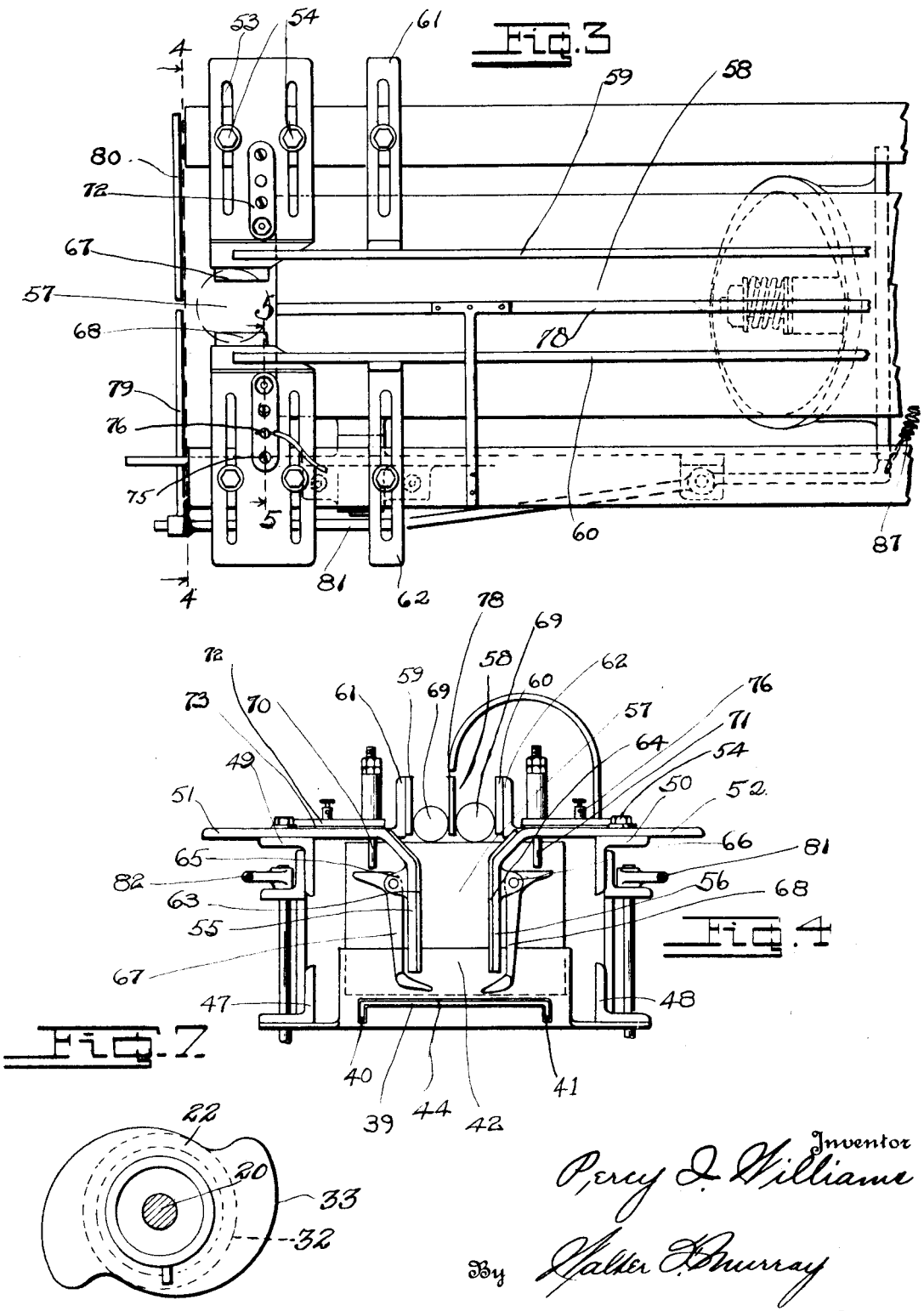

Patented Aug. 11, 1925.

1,549,399

UNITED STATES PATENT OFFICE.

PERCY Q. WILLIAMS, OF CINCINNATI, OHIO.

GLASSWARE CONVEYING DEVICE.

Application filed October 2, 1922. Serial No. 591,707.

*To all whom it may concern:*

Be it known that I, PERCY Q. WILLIAMS, a citizen of the United States of America, and a resident of Cincinnati, in the county of Hamilton and State of Ohio, have invented a new and useful Improvement in a Glassware Conveying Device, of which the following is a specification.

My invention relates to devices employed in conveying medium sized glass ware from a bottle machine to a leer, and for depositing the ware upon its base in the leer.

The invention disclosed herein consists in various modifications and improvements upon the device disclosed by me in my co-pending application, Serial #578,406, filed July 29, 1922.

An object of my invention is to provide a device capable of expeditiously and economically handling jars and ware of the general type of which the quart Mason jars are samples.

Another object of my invention is to provide a simple and efficient device for the purposes stated.

Another object of my invention is to provide a device which may handle ware of the class described, and which may interchangeably be associated with certain mechanisms common to conveyors of this type, whereby it is possible to use the same leers and the major portion of the conveyor mechanisms for various types of bottles.

Another object of my invention is to provide a mechanism for the purposes stated, the parts of which are substantial and positive in operation.

These and other objects are attained by means described herein and disclosed in the accompanying drawings, in which:

Fig. 1 is a plan view of a conveyor having mounted on it a mechanism embodying my invention.

Fig. 2 is an enlarged fragmental side elevation of parts of the device disclosed in Fig. 1, embodying my invention.

Fig. 3 is an enlarged plan view of parts shown in Fig. 1, embodying my invention.

Fig. 4 is a sectional view on line 4—4 of Fig. 3.

Fig. 5 is an enlarged sectional view on line 5—5 of Fig. 3.

Fig. 6 is a diagrammatical view of the wiring of a device embodying my invention.

Fig. 7 is a rear end view of a cam forming a detail of my invention.

The conveyor 7 is adapted to receive ware from a bottle machine, not shown, by way of a chute 8. The conveyor 7 comprises an endless belt carried by chains 9 and extending about sprockets 10 and 11 disposed at the forward and rear ends respectively of the frame 12, said sprockets being carried by suitable shafts 13 and 14. The shaft 13 is driven from a suitable motor 15 by suitable means such as the chain 16. The frame 18 carries a motor 19. The shaft 20 of the motor carries a suitable friction device 21 adapted to transmit motion from the shaft 20 to a cam 22 revolubly mounted on shaft 20. A spring 23 carried by the shaft 20 yieldingly retains the elements of the friction device in driving engagement upon one another. This yielding engagement is effected by having one end of the spring 23 abutting the hub 26 of the cam 22, the other end abutting a washer secured upon the rear end of the shaft. Rotatory motion of the cam 22 is precluded by means of an armature 27 pivotally mounted on a plate 28 carried by the frame 12, the armature engaging a lug 29 on the cam 22. The armature 27 is adapted to be moved out of the path of the lug 29, thereby permitting rotatory motion of the cam. A spring 30 yieldingly retains the armature 27 in the path of the lug 29, and an electro-magnet 31 is adapted to operate upon the armature and to move the armature from the path of the lug 29 against the yielding resistance of the spring 30. The cam has formed on it cam faces 32 and 33. The cam face 32 is engaged by a roller 34 carried by a reciprocating block 35 mounted in ways 36 formed in blocks 37 carried by the frame. A spring 38 yieldingly retains the roller 34 in engagement upon the cam face 32. The reciprocating block 35 is attached to a reciprocating plate 39 mounted on the frame 12 below the shaft 14. The side edges of the plate 39 are turned downwardly whereby to form flanges 40 and 41 extending longitudinally of the plate. The rear end of the plate 39 is supported on a fixed plate 42, carried by the frame 12, by means of rollers or rolls 43. In lieu of rollers 43, ball bearings or the like may be employed. The rear end of the fixed plate 42 extends upwardly and terminates adjacent the rear end of the conveyor 7. The vertically extending portion of the plate 42 has an inverted U shape slot 44 formed in it thru which the plate 39 may be reciprocated.

The forward end of the plate 42 has an upwardly extending flange 45 which forms a closure for the forward end of the chamber 46 containing the rollers 43. The side edges of the plate 42 are secured upon the angle bars 47 and 48 of the frame 12. The angle bars 49 and 50 of the frame 12, have adjustably mounted on them brackets 51 and 52. The upper portions of the brackets have longitudinal slots 53 thru which suitable fastening means such as bolts 54, may extend, the bolts securing the brackets upon the frame 12. The inner ends 55 and 56 of the brackets extend downwardly and provide side walls for a pocket or pockets 57 formed at the rear end of the way 58 extending longitudinally of the conveyor 7 intermediate the bars 59 and 60 extending lengthwise of the conveyor and carried by suitable brackets 61 and 62. The downwardly projecting portions 55 and 56 of brackets 51 and 52 carry facings 63 and 64 of asbestos or other similar suitable material. Lugs 65 and 66 formed on the depending portions of brackets 51 and 52, pivotally support Z shaped triggers 67 and 68. The lower ends of the triggers normally lie below the lower ends of portions 55 and 56 of brackets 51 and 52, and are adapted to be engaged by ware 69 when such ware is deposited in the pockets 57. The upper ends of the triggers are adapted to engage contact posts 70 and 71 carried by brackets 51 and 52 and insulated from said brackets. The contact posts are carried by bars 72 insulated from the brackets by means of suitable insulators 73 and 74. Screws 75 secure bars 72 upon the brackets. Bars 72 carry suitable binding posts 76. The binding posts are electrically connected with the electro-magnet 31, and a suitable source of electrical supply 77 is electrically connected with the electro-magnet 31 and the frame 12. The partition 78 extending thru the way 58 may extend lengthwise of the conveyor and provide two channels or ways thru which the ware 69 may be carried to the pocket 57 as shown in Figs. 1, 3 and 4 of this application and Fig. 8 of my Patent #1,487,000 in lieu thereof. In the practical application of the disclosed device, the ware in one of the ways 58 will always precede the ware in the other way. The electro-magnet is accordingly connected with the bar 72 located adjacent the way 57 thru which the last of the ware to be deposited in the pocket 58, is moved. The pocket 57 will therefore have received ware 69 from each of the sections of the way 58 before the reciprocating plate 39 is actuated. The rear end of the pocket 57 is normally closed by plates 79 and 80 carried at the rear ends of oscillating arms 81 and 82, which arms are pivotally mounted intermediate their ends upon the frame 12, and the forward ends of which arms engage the cam face 33. The arms 81, 82 comprise upper sections 83 mounted upon the upper ends of vertical shafts 84 revolubly supported by brackets 85 mounted on the frame 12, and lower sections 86 mounted upon the lower ends of vertical shafts 84, the lower sections 86 engaging the cam face 33. Springs 87 yieldingly retain the lower portions 86 of the arms in engagement upon the cam. It should be observed that the pocket 57 may be disposed immediately before the door 88 of the leer 89, and that the plates 90 of the leer conveyor 91 may serve as the base upon which the ware may be deposited. It should also be noted that a very small portion of the leer conveyor 91 is exposed to the atmosphere between the forward end of the leer and the door 88 of the leer, wherefore the plates 90 may be retained in a hot state and will not be subject to any decided cooling during the loading of ware into the leer by means of a device embodying my invention. This is of vital importance for the reason that should the plates 90 be permitted to cool below a determinable degree, the ware 69 will be subjected to cold spotting.

The operation of my device is as follows:

Normally the pocket 57 is closed at its rear end by plates 79 and 80. Ware passing over the conveyor 7 is deposited in the pocket 57 and engages the lower ends of the triggers 67 or 68 as the case may be, therefore bringing the upper ends of the triggers into electrical engagement upon the conductor posts 70 and 71. The engagement of the triggers upon the conductor posts closes the circuit embracing the electro-magnet 31, whereupon the armature 27 is withdrawn from the path of the lug 29 and the cam 22 is free to be rotated under the influence of the shaft 20 and the friction device 21. The rotation of the cam serves to actuate the arms 81 and 82 about their pivotal mountings whereby to withdraw the plates 79 and 80 from the rear end of the pocket 57. Thereupon the reciprocating plate 39, under the influence of the cam 32, moves rearwardly and engages the ware 69 adjacent the base of the ware and pushes the ware thru the door 88 into the leer. The springs 38 and 87 return the reciprocating plate and the arms to their normal positions. As soon as the ware is moved from the pocket 57, the triggers assume their normal positions and the circuit embracing the magnet 31 is broken whereupon the spring 30 returns the armature 27 to its normal position and checks further movement of the cam 32.

What I claim is:

1. In a device of the class described the combination of a conveyor comprising a frame and an endless belt mounted on the frame, a conductor post mounted on the frame and electrically insulated therefrom.

brackets mounted on the frame, a trigger pivotally mounted on one of the brackets, extending at one end below the bracket and adapted to engage the conductor post, plates removably supported adjacent the brackets whereby to form a pocket between the plates, the brackets and the endless belt and into which pocket the belt is adapted to discharge ware, the ware being adapted to engage the lower end of the triggers whereby to move the triggers into electrical communication with the conductor post, a reciprocating plate adapted to be moved over the bottom of the pocket and to move ware therefrom, electrically operable means controlling the reciprocating plate electrically connected with the conductor post, and means associated with said last mentioned means for withdrawing the first mentioned plates whereby to open the pocket to permit movement of the ware by the reciprocating plate.

2. In a device of the class described, the combination with a conveyor comprising a frame and an endless belt mounted on the frame, of brackets mounted on the frame at one of its ends and having portions extending in horizontal alignment with the belt whereby a way is formed between the brackets in horizontal alignment with the belt, a conductor post mounted on one of the brackets and electrically insulated therefrom, a trigger pivotally mounted on one of the brackets extending below the lower end of the bracket and extending into the way, the upper end of the trigger being normally spaced from the conductor post, the lower end of the trigger being adapted to be engaged by ware discharged into the way from the belt and to be moved by the ware about its pivotal mounting whereby to bring the upper end of the trigger into electrical contact with the conductor post, a reciprocating plate disposed below the brackets adapted to move ware from the way, means for reciprocating the plate, and an electricity controlled means electrically connected with the conductor post normally rendering inoperative the means for actuating the reciprocating plate.

3. In a device of the class described, the combination with a conveyor comprising a frame and an endless belt mounted on the frame, of brackets mounted on the frame at one of its ends having portions extending in horizontal alignment with the belt whereby a way is formed between the brackets in horizontal alignment with the belt, a conductor post mounted on one of the brackets and electrically insulated therefrom, a trigger pivotally mounted on one of the brackets extending below the lower end of the bracket and extending into the way, the upper end of the trigger being normally spaced from the conductor post, the lower end of the trigger being adapted to be engaged by ware discharged into the way from the belt and to be moved by the ware about its pivotal mounting whereby to bring the upper end of the trigger into electrical contact with the conductor post, a reciprocating plate disposed below the brackets adapted to move ware from the way, means for reciprocating the plate, an electricity controlled means electrically connected with the conductor post normally rendering inoperative the means for actuating the reciprocating plate, plates mounted on the frame normally forming a closure for the way whereby to provide a pocket for the ware, and means controlled by the plate reciprocating means for withdrawing the last mentioned plates from their normal positions whereby to permit movement of the ware from the pocket.

In testimony whereof, I have hereunto subscribed my name this 22nd day of September, 1922.

PERCY Q. WILLIAMS.